US005652758A

United States Patent [19]
Donley

[11] Patent Number: 5,652,758
[45] Date of Patent: *Jul. 29, 1997

[54] DATA RESYNCHRONIZATION

[75] Inventor: Greggory D. Donley, Sunnyvale, Calif.

[73] Assignee: Unisys Corporation, Blue Bell, Pa.

[*] Notice: The term of this patent shall not extend beyond the expiration date of Pat. No. 5,537,418.

[21] Appl. No.: 680,409

[22] Filed: Jul. 15, 1996

Related U.S. Application Data

[62] Division of Ser. No. 29,864, Mar. 11, 1993, Pat. No. 5,537,418.

[51] Int. Cl.$^6$ ............................................. H04J 3/06
[52] U.S. Cl. ............................ 370/503; 375/372; 375/354
[58] Field of Search .................... 370/100.1, 85.15, 370/105.1, 85.1, 85.12, 105.4, 503, 516, 517, 518; 375/371, 372, 354, 355, 356; 364/228.1, 238.6, 238.7, 243, 243.5, 244; 371/42, 46, 69

[56] References Cited

U.S. PATENT DOCUMENTS 5,103,467  4/1992  Bedlek et al. ........................ 375/118
5,241,543  8/1993  Amada et al. ....................... 370/100.1

*Primary Examiner*—Douglas W. Olms
*Assistant Examiner*—Ajit Patel
*Attorney, Agent, or Firm*—John J. McCormack; Mark T. Starr

[57] ABSTRACT

An array of digital data processing nodes arrayed in at least one node-ring where each node has its own transmission-clock which is approximately the same frequency as the transmission-clock of other nodes in the ring and where data is transferred in data-packets, the combination therewith of data-transmission-resynchronizing stage comprising a "circular FIFO" arrangement.

10 Claims, 4 Drawing Sheets

DATA RESYNCHRONIZATION

This application is a division of application Ser. No. 08/029,864, filed Mar. 11, 1993, now U.S. Pat. No. 5,537,418.

FIELD OF INVENTION

This invention relates to information processing node-rings and particularly to a circular FIFO array therein to resynchronize data-transmit clocks.

BACKGROUND, FEATURES

Workers in the arts of making and using information-processing networks are well aware of today's challenge of balancing cost-effective hardware against evolving transmission speeds. This is what this invention addresses.

For instance, today's users are more and more asking for equipment which is simpler, yet less expensive.

In considering the design of our next-generation Server, we at first favored "distributed (ring-) architecture" with interconnect based on the IEEE P1596 SCI standard. (SCI: scaleable coherent interconnect; assume "Server" is a collection of "nodes" with supplemental circuitry; i.e., CPUs distributed in rings to affect a single, unified system; a "ringlet" is a min-size ring.)

This standard provides that when data is transferred between nodes, the transfer will be synchronous with a "transmit clock" signal ($C_T$) which is transmitted with the data and typically generated by its own oscillator ($O_1$). But in each node, incoming data would have to be resynchronized to a "local clock" ($C_L$) which is specified to have the same frequency as the "transmit clock" signal ($C_T$) arriving with the data, but has its own local oscillator $O_L$. However, due to oscillator variation and thermal changes, the transmit clock ($C_T$) can be expected to drift with respect to the local clock ($C_L$). Thus, anytime data is transferred between systems, resynchronization will be necessary; e.g., when data is transferred along each link between nodes it must be synchronized (with the local clock).

SCI Nodes, Ringlets

As workers know, each node in a SCI RING, or Ringlet, can typically comprise I/O devices, memory and processors. In fact, each node is usually capable of operating as an independent server. However, it is often desirable to have a single unitary system which includes more processors than is practical to place on a single bus—thus, a multi-node server. And, with processor speeds increasing faster than bus speeds, the number of processors per bus is actually decreasing.

SCI is an attempt to solve this problem by creating an interface that can transparently connect multiple servers (multiple nodes) and make them appear to be a single system whose processing power is the sum of the connected system's processing power. It does this by providing a physical connection for passing data, as well as a logical cache coherence protocol. Because all the processors in the whole system are "coherent" (i.e., are directly linked to all data sites—as opposed to the more usual, non-coherent string of processors in a distributed-architecture system, where a processor in a given node must transmit a "special message" in order to access other nodes-thus SCI has direct-access to all, there are no "local copies") and share a single memory space, each processor is able to access any part of memory or I/O devices across the entire system as though they were local.

This standard SCI approach seems more complex and difficult to implement than it needs to be. My invention is less so, while addressing the same need.

"Delay-line Method"

The SCI standard approach to this situation is to feed each of the incoming data bits, plus a flag bit, through separate tapped delay lines: a "Delay-line Method". Using this approach, it is possible to compare the phases of the incoming (transmit) -clock and the local clock, and then choose the appropriate tap to sample the data with respect to (e.g., in sync with) the local clock, thereby always assuring that the data is "valid" when sampled.

As the two clocks change phase with respect to one another, and the selected tap is adjusted, eventually, the selected tap will be either the first or the last tap of the delay line, depending on whether the incoming or local clock is faster. At this point there will be no further room for adjustment and the tap will have to be switched from the end-tap to one of the center-taps where the data is also valid with respect to (in sync with) the local clock. This will make the system either fail to sample a data bit or to sample the same bit twice, depending upon which clock is faster. But, since data is sent in packets, if one skips, or resamples, data only between packets, no harm results.

Problems

This method of synchronization places strict demands on the ASIC technology used to implement it. CMOS is disfavored because it tends to have a high spread between the best- and worst-case gate delays over varying conditions of temperature, voltage and process; thus, the preferred implementation of this "Delay-line" method is with an ECL gate array though this is expensive. Also, a large number of gates is needed. The method requires 17 tapped delay lines, each of which must have a total delay of at least 2 clock periods under best-case conditions (temperature, voltage and process), and each delay line requires 16 or more stages, or taps, each requiring several gates. Laying-out and routing these delay lines also places additional constraints on the gate array architecture.

In spite of these constraints and expense, there are workers today who propose offering parts designed to this standard and using this Delay-line method.

This invention addresses this problem, teaching the use of a "circular FIFO array".

An object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawing.

DESCRIPTION OF THE PREFERRED EMBODIMENT

Following are details of a preferred "circular FIFO" clock-resynchronizing embodiment and related environment in which such an embodiment can be advantageously employed. The methods and means discussed herein, will generally be understood as constructed and operating as presently known in the art, except where otherwise specified; likewise all materials, methods, devices and apparatus described herein will be understood as implemented by known expedients according to present good practice.

Server Node—Interconnect/synchronization via circular FIFO

As an alternative to this IEEE standard, designed a "circular FIFO" scheme for node to node synchronization; I call it "circular FIFO" because, rather than using tapped delay lines, this method uses a circular FIFO to synchronize the data. (By circular FIFO I mean a first-in, first-out register array characterized by registers arrayed in a "circle" to be filled in circular sequence; e.g., as very schematically indicated by, the six registers R-0, R-1 through R-5 in FIG. 2. Have, when R-0 is full, the bit stream goes to R-1 next, then to R-2 etc., to begin anew at R-0 when R-5 overflows. As noted below, one should avoid reading-out from a register adjacent to one that is being written-to; and preferably, read-out from an "opposing" register; e.g., from R-3 when R-0 is written-to). The scheme can best be understood by tracing FIG. 1, a block diagram of the related circuit (here, assume that a collection of "nodes", or CPUs, with supplemental circuitry, can function as a "server", with the nodes being arrayed in one, or more, rings to function as a single unitary server system).

The purpose of this circuit is to receive data packets of signals INDATA<16:0> which are pre-synchronized to an input clock, ECLK (or transmit-clock, which is also transmitted as OUTDATA<17>). A salient feature of this design is found in combined blocks "ASYNC-COUNT", "SYNC-COUNT", "COMPARE", and "MUX-REG" in FIG. 1. I will first explain how the method works and then how these blocks contribute to the operation.

Operation theory, in general

Figure 1D:
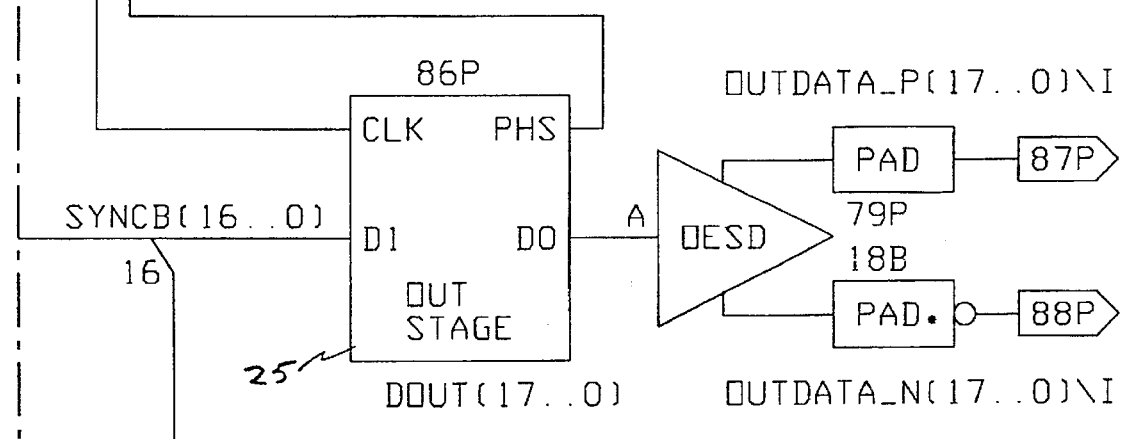
FIG. 1 (1A, 1B, 1C and 1D) is a block diagram of my preferred embodiment.
Figure 2:
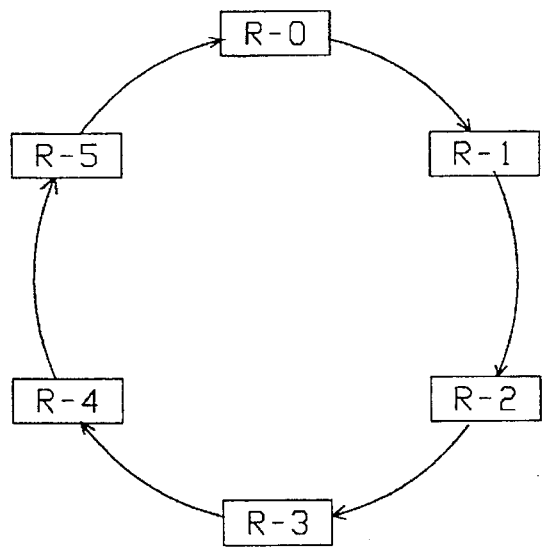
FIG. 2 is a block diagram of a related circular register array.
Figure 1A:
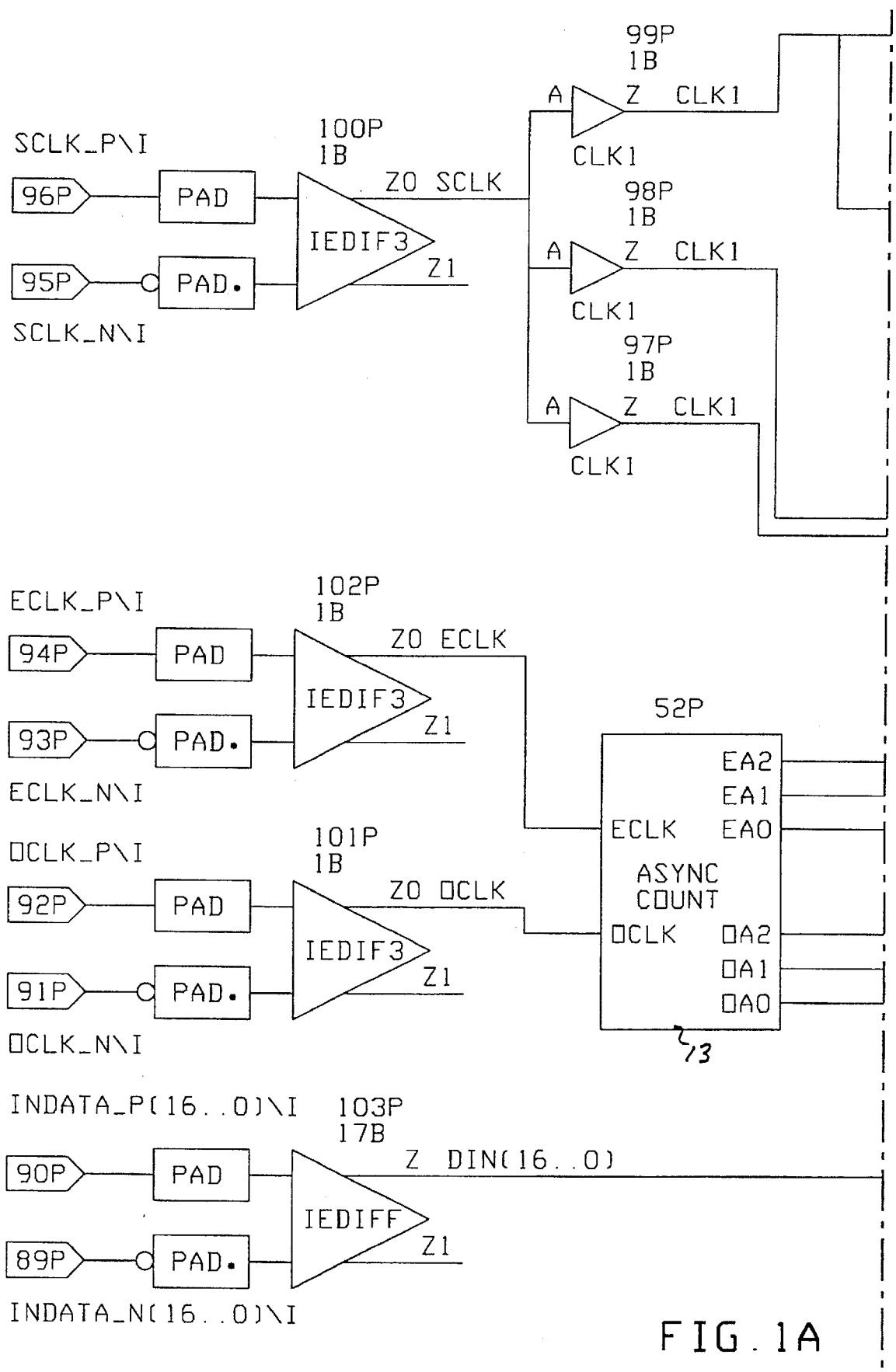
Figure 1B:
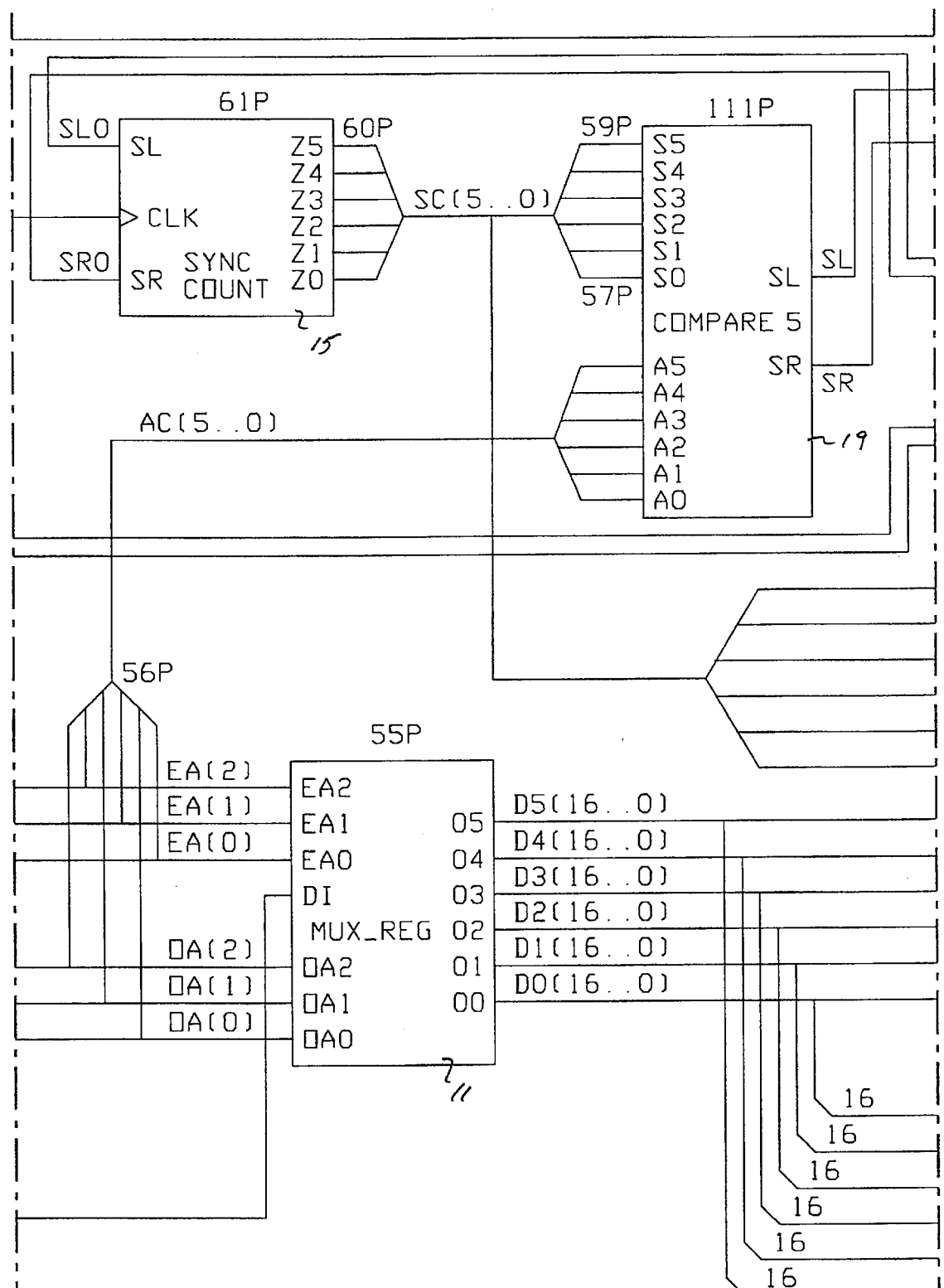
Figure 1C:
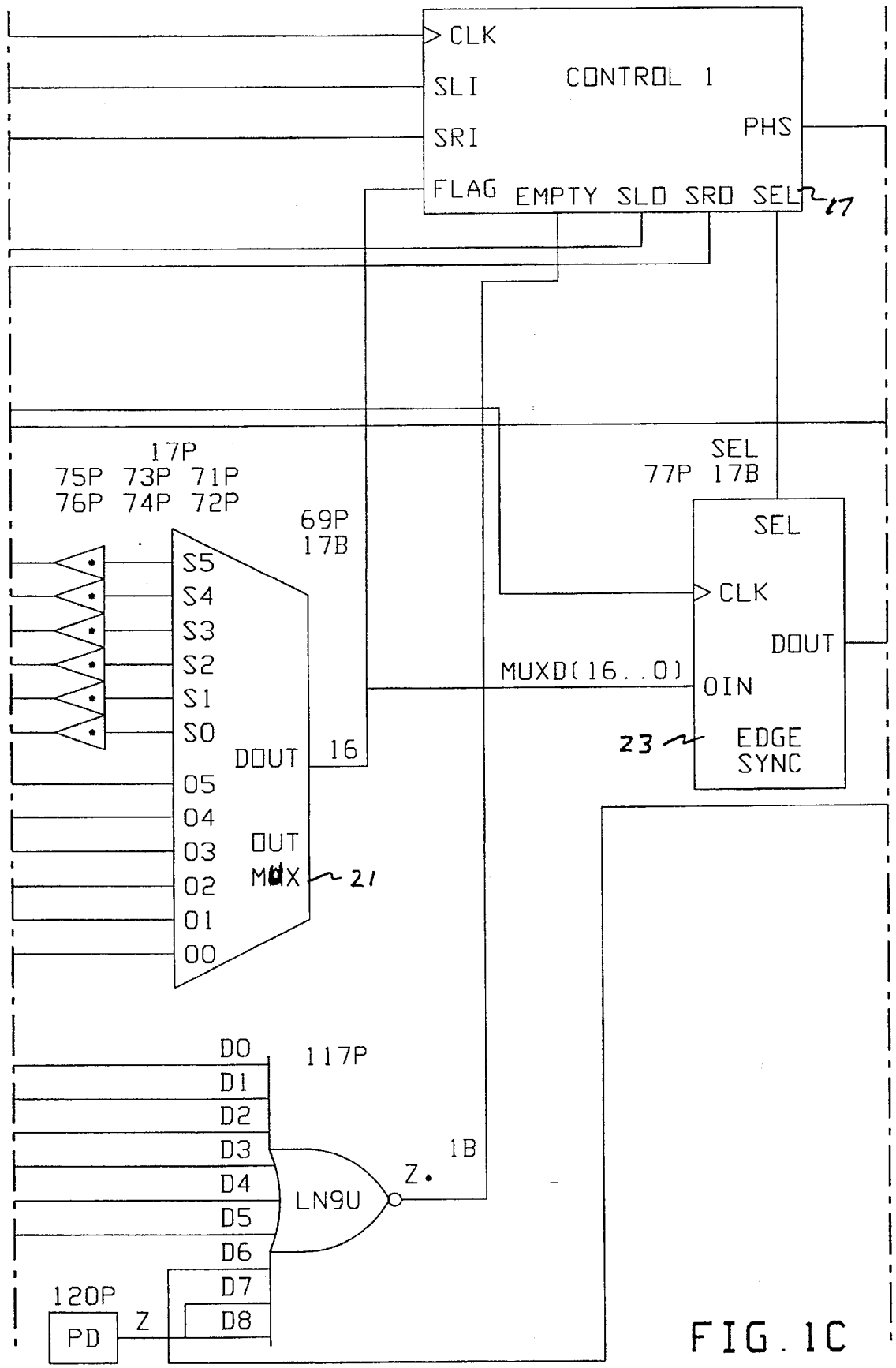

Block 11 (MUX-REG plus MUX-OUT) contains six 16-bit-wide registers into which the incoming data bits (called "symbols" in SCI) are written. These registers are schematically depicted in FIG. 2, and arrayed, circularly, in two groups of three: This is the "circular FIFO" array that characterizes my subject method. The symbols are written into this array of registers sequentially, in a circular fashion, (0,1,2,3,4,5, then 0,1 etc.) on each incoming clock. If the data is then read-out of the register that "opposes" the register currently being written-into, it will have been stable for three clocks and will remain stable for another three clocks. That is, if the data is currently being written-into register n, then it can be safely read from register n+3 (for a "Mod6" or 6-total registers), or, alternatively, from n+4 when n+2 is being written-to.

The data is read by selecting the appropriate output of the multiplexer capable of selecting any of the 6 registers and then clocking this data into another register (e.g., MUX-OUT) using the outgoing clock—to thereby achieve synchronization. Here, I prefer to divide the incoming clock signals into ECLK and OCLK (i.e., even or odd signals generated 180° apart by the incoming clock). Here, the local clock signal is SCLK, generated by an oscillator at this node. On each ECLK or OCLK, the "next" register will be written-into, and on each SCLK, the "next" register will be read-out -so that the data being read will always be valid (assuming the two clocks are exactly the same frequency, which usually isn't the case).

Here (FIG. 1), the incoming clock signal is separated from a bit-packet (e.g., input as signals DIN in FIG. 1) and as aforementioned, preferably split into two related clock-signals 180° out of phase, i.e., ECLK and OCLK (or "even" and "odd", generated by "incoming clock" which has its own external oscillator). It is more usual to transfer data in sync with the rising edge of a clock pulse; but here, we prefer to use both the rising-edge, or leading edge (e.g., via ECLK) and the falling edge, or trailing edge (e.g., via OCLK).

These clock signals are fed to ASNC COUNT block 13 where ECLK is used to "point" to (select) the "even-registers" of the circular FIFO in MUX REG (i.e., to R-0, R-2, R-4; see FIG. 2) and OCLK is used to "point to" the "odd-registers" (R-1, R-3, R-5; see FIG. 2), as known in the art. Thus, this "circular FIFO" in MUX REG is best viewed as two sets of three registers.

Allowed drift between the incoming (ECLK, OCLK) and outgoing (version of SCLK) clocks, will eventually cause the read point to catch up to the write point in the FIFO,—or, alternatively, the read point will lag behind and the write point will catch up.

Either way, data will be corrupted. Since the data is sent in packets, or groups of symbols, the only really important requirement is that data be preserved within its packet—and such "drift" be compensated for only between packets.

Therefore, if one sets the read-point opposite the write-point in the FIFO at the beginning of a packet, and if the clocks don't drift too fast, the entire packet can be written to the FIFO, and then quickly read-out, before either clock leads or lags enough to corrupt data. Then, if, between packets, the read and write positions drift, one can reset the read position without losing data. That is, moving the read pointer can cause a symbol to either be skipped or read twice, depending on the direction of the adjustment; however, so long as this occurs between packets, it causes no harm.

How FIG. 1 works

The following will explain how my circuit implements the described "circular FIFO" method. Here, there are two clock signals received with the data, ECLK and OCLK (off transmit-clock, with each packet) which are 180 degrees out of phase with one another. [Actually, there is only one transmit clock signal sent between nodes, but because the data transitions on both rising and falling edges of the clock signal, it is preferred to use one normal and one inverting input buffer to generate the two clock signals.] The outgoing clock (off SCLK) is twice the frequency of the incoming clock; thus the data which is transferred on both edges of the incoming clock is transferred on only the rising edge of the outgoing clock, until the clock is output, then it is divided down to the same frequency as the input clock.

Each of the input clocks, ECLK and OCLK, is used to clock a simple state machine [e.g., collection of Flip-Flops, counters, registers etc.: ASYNC COUNT 13 in FIG. 1]. Each of these state machines follows the following pattern: 001, 010, 100, 001, etc. [a state machine will store data and shift it responsive to some clock signal, as known in the art; this ASYNC COUNT may "enable", or point to, one of the six registers in MUX REG to be written-into; e.g., one of "even registers" R-0, R-2, R-4, as in FIG. 2, off the rising-edge of ECLK, or one of "odd-registers" R-1, R-3, R-5 off the falling edge of OCLK; thus, ASYNC COUNT may include a shifting six-bit shift register to control this point function as known in the art].

The six registers in the MUX-REG block 11 can be divided into two groups of three. One is associated with OCLK and its state machine (in ASYNC COUNT), and the other is associated with ECLK and its state machine. What each of these state machines (in ASYN COUNT) is used for is to select which one of the three registers in MUX REG to which data (e.g., DIN) will be written, on the next transition of ECLK or OCLK. In essence, MUX-REG 11 is composed of two separate, three-register FIFOs. One is written-to on every edge of ECLK, and the register written-to is the one indicated by the three-bit state machine associated with ECLK. The other is written-to on OCLK according the state machine incremented by OCLK.

If the 6 registers are taken together, the effect is that of writing data into a six register FIFO (the "circular FIFO") with a clock rate equal to twice that of ECLK/OCLK. This is necessary because the data changes on both edges of the clock. ASYNC-COUNT block 13 contains these two three-bit counters whose outputs are fed to MUX-REG 11 along with the data to determine which register to load.

Block SYNC-COUNT 15 contains a state machine/counter that determines which of the six registers in MUX-REG 11 will be read next. This state machine follows the pattern 000001, 000010, 000100, 001000, 010000, 100000, then 000001, etc. Block SYNC COUNT also has inputs from a Control Block 17 which can cause the count to skip a state or remain in the same state.

The block COMPARE 19 is critical for this circuit. The two counters in ASYNC-COUNT 13, taken together and interleaved, can be taken as a single state machine with the following sequence 000011, 000110, 001100, 011000, 110000, 100001, then 000011, etc. COMPARE takes this as input combined with the output of SYNC-COUNT 15. These two counters have each been designed to have a single field of shifting "one bits". This allows the compare function to combinationally compare these two registers and to indicate whether the read-point and write point in the FIFO (in MUXREG) are aligned properly, or whether the read point is leading or lagging its optimum position. The exact function can be described in a table, but it basically consists of looking at all 36 valid combinations and then generating a function that indicates whether the read point needs to be moved ahead (for each combination) and a function that indicates whether the read point needs to be moved back (for each combination).

CONTROL block 17 synchronizes the signal generated by COMPARE 19 and determines when an adjustment to the read point is necessary; then, when it detects the gap between two packets, it signals SYNC-COUNT 15 to make the required adjustment.

The remaining two blocks (EDGE SYNC 23, OUT STAGE 25) function to assure that the packets to be transmitted always begin on the rising edge of the output clock. This was necessary for our particular design, but is not part of the SCI spec. Deleting or adding symbols to the data stream changes where the packet begins with respect to the clock. Aligning the packet to a rising edge is accomplished by inserting or deleting an extra register stage, depending on whether symbols are being added or deleted and on whether the stage is currently in the data path or not.

Variations

Some variations or modifications of the FIG. 1 arrangement should be considered as extensions of my "circular FIFO" method. First, the use of the dual input clocks that are out of phase adds a little complication to the design, but is not an essential feature of the solution. (So, instead, one could merely use the transmit clock directly and make the circular FIFO comprise 4+ registers (three wouldn't avoid the restriction vs. adjacent registers written-in and reading-out).

Also, it is nonessential that data be transferred on both edges of an input clock that has half the frequency of the clock to which data is being synchronized. Rather, this should be considered a general method for taking data which is synchronized to a "source clock" (e.g., incoming) and synchronizing it to another clock (e.g., local) that has the same frequency, but is generated by a different oscillator such that there can be drift between the clocks.

Also, one should assume that my method is applicable only for data which is packetized or otherwise constructed such that there exists detectable data which can be deleted occasionally without loss of information.

The length of the "circular FIFO" (number of registers) used for re-synchronization is not fixed. The nature of the data, being transferred on both edges of the clock, made it convenient to use an even number of registers; also the length of the data packet, coupled with the clock drift rate and desired margins, indicated that 6 registers was optimum for this design.

However, for short packets with tightly controlled clock drifts, a FIFO with as few as 3 or 4 registers could be feasible;—e.g., to minimize the average delay from data input to synchronized data available.

Further, the COMPARE function can be varied to change the point at which an adjustment occurs to add or delete data symbols.

Also, preferably built into CONTROL block 17 is a hysteresis circuit which controls for how many clocks the synchronized status indicator from COMPARE block 19 must be stable to be considered valid. This circuit can be optimized to filter-out jitter and other clock variations in order to eliminate unnecessary symbol insertion and deletions.

Variation of any of the foregoing parameters will still use essentially the same method.

CONCLUSION

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related node arrays and associated clocking. Also, the present invention is applicable for use with other related data transmission/clocking arrangements.

The above examples of possible variations of the present invention are merely illustrative. Accordingly, the present invention is to be considered as including all possible modifications and variations coming within the scope of the invention as defined by the appended claims.

What is claimed is:

1. An array of digital data processing nodes arrayed in at least one node-ring and having an external transmission clock provided for each said node-ring, wherein each said node has its own internal transmission-clock set at approximately the same frequency as said external transmission-clock; and wherein data is transferred in data-packets; plus the combination, with said array of nodes, of data-resynchronizing means comprising a first-in-first-out (FIFO) array of prescribed like register means arranged in a circular first-in, first-out (FIFO) arrangement, and including a multiplex stage comprising a set of N registers operated in first-in, first-out fashion, where N is a positive integer.

2. The invention of claim 1, comprising six FIFO registers, arranged in two like sets, each comprising three registers.

3. The invention of claim 1, wherein the signals from said external and internal clocks are generated by different source means and are applied to a multiplex stage, these signals having the nominal frequency of their source means but being subject to "drifting" apart.

4. The invention of claim 1, wherein said circular FIFO arrangement includes a multiplex stage which, in turn, comprises an input-multiplex unit which presents input to said node ring and an output multiplex unit which presents output from said node ring.

5. The invention of claim 4, wherein said input-multiplex stage comprises N registers arrayed so that data is input thereto in sequential circular fashion, where N is a positive integer.

6. The invention of claim 5, wherein said N registers are arrayed so that, in said ring, the read-point is opposed to the write point at the beginning of a data packet, which is then quickly read-out before significant inter-clock-drift can occur.

7. The invention of claim 6, wherein the said multiplex stage is arranged to include means for resynchronizing of read-point with write-point to correct clock-drift between packets and without compromising data.

8. For a set of digital data processing nodes arrayed in at least one node-ring where each node has its own local transmission-clock which is approximately the same frequency as the transmission-clock of other nodes in the ring, where said node-ring is made to comprise a circular array of N registers operated in first-in/first-out (FIFO) fashion, where N is a positive integer, said N registers being made to include six FIFO registers, arrayed in two sets of three registers and where data is transferred in data-packets, the method of resynchronizing data transfer comprising:

developing a FIFO array of prescribed like register means disposed as a circular first-in, first-out array wherein said FIFO array also includes an input-multiplex portion and an output multiplex portion; and wherein said input-multiplex portion is made to comprise N registers arrayed so that data is input thereto in sequential circular fashion; where N is a positive integer; and applying said FIFO array in said node-ring.

9. The method of claim 8, wherein said N registers are arrayed in a circle with the read-point is opposed to the write point at the beginning of a data packet, which is then quickly read-out before significant inter-clock-drift can occur; and wherein inter-clock drift is compensated for between packets.

10. The method of claim 9, wherein the said multiplex stage is arranged to include means for resynchronizing of read-point with write-point to correct clock-drift between packets, and without compromising data.

* * * * *